Sept. 5, 1933.   A. C. MARSHALL   1,925,699
COUPLING OR CLAMP FOR SCAFFOLD POLES OR OTHER BODIES
Filed Feb. 9, 1932

Inventor,
Arnold Clarence Marshall,
By his Attorney,
Harold D. Penney.

Patented Sept. 5, 1933

1,925,699

UNITED STATES PATENT OFFICE 1,925,699

COUPLING OR CLAMP FOR SCAFFOLD POLES OR OTHER BODIES

Arnold Clarence Marshall, London, England

Application February 9, 1932, Serial No. 591,845, and in Great Britain July 20, 1931

6 Claims. (Cl. 189—36)

This invention relates to couplings or clamps for scaffold poles or other bodies, and it has for its object to provide a simple and efficient device whereby two bodies, scaffold poles for example, placed at right angles one to another may be firmly connected.

A clamp according to one form of the present invention comprises two substantially U shaped members, so arranged that they may engage and partially surround the outer peripheries of two poles or other bodies placed at right angles to one another, the adjacent points of the circumferences of said bodies being in contact.

Of the U shaped members just referred to, one forms the body of the device and the other, which is pivotally connected to the body on an axis transverse thereto, forms a cap which may be caused by a bolt or the like to press the poles against the surfaces of the body and cap contacting therewith and against each other.

The longitudinal axes of the circular portions engaging the poles or other bodies are disposed at right angles one to the other.

In order that the invention may be the better understood, a drawing is appended, in which:—

Figure 1:
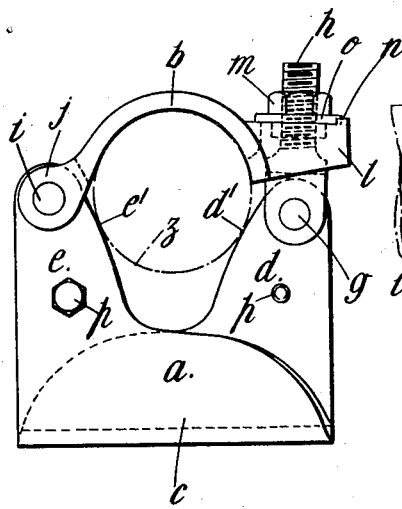
Fig. 1 is a side view of a coupling according to this invention.

Referring to the accompanying drawing, $a$ indicates one portion of the coupling, hereafter referred to as the body portion, and $b$ the other or cap portion.

The body portion is substantially of U shaped outline, the base $c$ of which, where it engages the pole, shown in dotted lines Y, is of substantial width and has provided upon it on opposite sides and at opposite ends limbs or projections indicated respectively by $d$, $e$, one of said projections $d$, being perforated at $f$ for the passage of a pin $g$, serving as a pivot for the throw-over bolt $h$.

The projection $e$ is perforated for the passage of a pin $i$, engaging perforations formed in lugs $j$ disposed upon one side and at one end of the curved cap $b$, which engages the second pole indicated by dotted lines Z.

Projecting from the opposite side of the curved cap $b$ and arranged at the opposite end thereof to that of the aforesaid lugs $j$, are a pair of lugs $l$ spaced to permit the passage of the body of the throw-over bolt $h$.

In order to prevent the nut $m$ of the throw-over bolt from riding or being pushed off the lugs $l$, the said lugs are provided upon their upper surfaces at the outer end with projections $n$ so spaced that they will prevent the passage of the nut. Preferably, the nut is provided with a flange or collar at its base, indicated by $o$, said collar being of such depth that its upper surface is in a plane somewhat above the plane of the tops of the projections $n$.

By this means, a spanner operating the nut does not foul the projections $n$.

In this case the screw would preferably be arranged so that whilst it can be rotated and is capable of a certain amount of longitudinal movement, its entire removal from the lug $l$ would be prevented.

Under certain conditions, as for instance when securing a putlog to a ledger, the device would preferably be used with the cap facing downwards. In this position not only is it more conveniently applied but a person standing at a lower level can more readily operate the nut $m$; further, the plain outer surface of the part $c$ being free from any projections it presents a flat surface upon which to rest a plank without fear of the same rocking or twisting.

By arranging the connecting pivot for the parts at one end of the device and the clamping means at the other end of the device and upon the opposite side of said device to that of the said pivot, the possibility of securing a maximum surface of contact between the clamp members and the tubes is ensured.

The inner surfaces $d'$ and $e'$ of the projections $d$, $e$ are inclined so as to firmly clamp the body $a$ and cooperate with the cap in retaining same.

With either form of fastening, the arrangement could be such that the nut or head of the bolt does not project beyond the plane of the top of the curved cap when the parts are in the clamping position, and by this means the flat surface of the cap could be utilized to support a board.

The parts of the device may conveniently be in the form of pressings or stampings, and may be made from sheet metal cut to the desired outline and pressed to shape.

Figure 2:
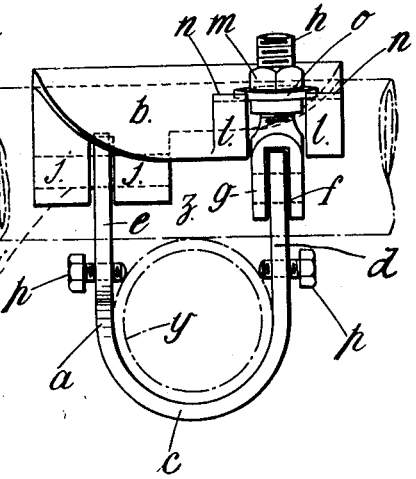
Fig. 2 is a front view.
Figure 3:
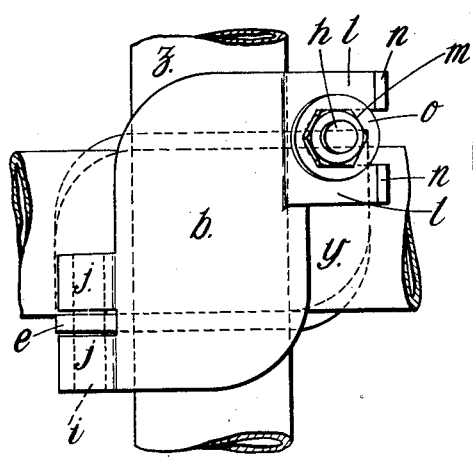
Fig. 3 is a plan as seen from the top with the cap in the closed position.
Figure 4:
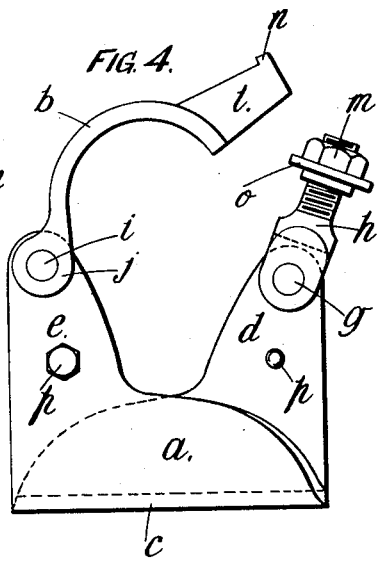
Fig. 4 is a similar view to Figure 1, showing the cap in a partly open position.

In order to allow the clamp to be temporarily applied, screws such as $p$ may be provided upon the body portion of the clamp, said screws being so arranged that they are upon a line above the longitudinal centre line of the tube to which the body is applied, as shown more clearly in Fig. 2.

If desired, the parts may be strengthened by forming them wholly or partly of T shaped cross-sectional outline.

I claim:

1. A coupling or clamp for connecting together two scaffold poles or other bodies arranged in contact and at a right angle with respect to each other, comprising two open ended members designed to partially surround the respective bodies, means hingedly connecting said members and means for drawing said members toward each other to maintain said bodies firmly in contact one with the other.

2. A coupling or clamp for connecting together two scaffold poles or other bodies arranged in contact and at a right angle one with respect to the other, comprising two open ended arcuate members designed to partially surround the respective bodies, means hingedly connecting said members at one end, and means at the other end for drawing said members toward each other to maintain said bodies firmly in contact one with the other.

3. A coupling or clamp for connecting together two scaffold poles or other bodies arranged in contact and at a right angle one with respect to the other, comprising two open ended members designed to partially surround the respective bodies, means hingedly connecting said members at one end upon one side thereof, and means disposed at the other end of said members and upon the other side of the same for drawing said members toward each other to firmly clamp said bodies together.

4. A coupling or clamp for connecting together two scaffold poles or other bodies arranged in contact and at a right angle one with respect to the other, comprising two open ended arcuate members designed to partially surround the respective bodies, means hingedly connecting said members at one end thereof, and means disposed at the other end of said members and upon the other side of the same for drawing said members toward each other to firmly clamp said bodies together.

5. A coupling or clamp for connecting together two scaffold poles or other bodies arranged in contact and at a right angle one with respect to the other, comprising open ended members designed to partially surround the respective bodies, a projection at one end of one of said members, means upon one end of the other member a pivot connecting said projections, a projection at the other end and upon the other side of same and means upon the other member engaging said projection in a manner to permit of drawing said members toward each other to firmly clamp said bodies together, and surfaces upon the projections of one member designed to co-operate with the other member to assist in maintaining in position the body surrounded thereby.

6. A coupling or clamp for connecting together two scaffold poles or other bodies arranged in contact transversely one with respect to the other, comprising open ended arcuate members designed to partially surround the respective bodies, a projection at one end of one of said members, means upon one end of the other member, a pivot connecting said projections, a projection at the other end and upon the other side of same, and means upon the other member engaging said projection in a manner to permit of drawing said members toward each other to firmly clamp said bodies together and surfaces upon the projections of one member designed to co-operate with the other member to assist in maintaining in position the body surrounded thereby.

ARNOLD CLARENCE MARSHALL.